United States Patent
Desjardins

(10) Patent No.: US 7,976,604 B2
(45) Date of Patent: Jul. 12, 2011

(54) FILTER HOUSING WITH QUICK RELEASE CLIP ADAPTED TO DISENGAGE THE FILTER ELEMENT

(75) Inventor: Michael Desjardins, Portage, MI (US)

(73) Assignee: Mann + Hummel GmbH, Ludwigsburg (DE)

( * ) Notice: Subject to any disclaimer, the term of this patent is extended or adjusted under 35 U.S.C. 154(b) by 499 days.

(21) Appl. No.: 12/195,457

(22) Filed: Aug. 21, 2008

(65) Prior Publication Data

US 2010/0043367 A1  Feb. 25, 2010

(51) Int. Cl.
*B01D 46/00* (2006.01)

(52) U.S. Cl. ............... 55/503; 55/493; 55/502; 292/85; 292/100; 292/200; 292/DIG. 38

(58) Field of Classification Search .................. 55/493, 55/502, 503, 504; 292/80, 85, 87, 95, 100, 292/194, 200, 210, 247, 250, 256, 283, 303, 292/304
See application file for complete search history.

(56) References Cited

U.S. PATENT DOCUMENTS

| | | | | |
|---|---|---|---|---|
| 3,353,341 A | * | 11/1967 | Stripp | 55/502 |
| 3,822,905 A | * | 7/1974 | Bell | 292/87 |
| 4,213,643 A | | 7/1980 | Blind et al. | |
| 5,120,334 A | * | 6/1992 | Cooper | 96/422 |
| 5,178,760 A | * | 1/1993 | Solberg, Jr. | 210/451 |
| 5,569,311 A | * | 10/1996 | Oda et al. | 55/493 |
| 5,725,624 A | * | 3/1998 | Ernst et al. | 55/502 |
| 5,730,768 A | * | 3/1998 | Kaminaga et al. | 55/385.3 |
| 6,306,192 B1 | | 10/2001 | Greif et al. | |
| 6,383,268 B2 | * | 5/2002 | Oda | 96/134 |
| 7,311,748 B2 | | 12/2007 | Holmes et al. | |

FOREIGN PATENT DOCUMENTS

| WO | WO2005046841 | | 5/2005 |
|---|---|---|---|
| WO | WO 2005046841 A1 | * | 5/2005 |

* cited by examiner

*Primary Examiner* — Robert A Clemente
(74) *Attorney, Agent, or Firm* — James Hasselbeck

(57) ABSTRACT

Disclosed is a filter housing having two abutting filter housing portions with a filter element sized and configured to be installed the housing. At least one quick release retention clip is pivotally secured to the filter housing and operable between an engaged and a disengaged position. In the engaged position the retention clip retentively closes the housing. In the disengaged position the retention clip is operable to apply a separating force urge the filter housing portions to separate and release the filter element.

12 Claims, 6 Drawing Sheets

FILTER HOUSING WITH QUICK RELEASE CLIP ADAPTED TO DISENGAGE THE FILTER ELEMENT

TECHNICAL FIELD

The present invention relates to a quick release retention clip for filter housing and, more particularly, to a quick release retention clip operable to separate the housing and release the filter.

BACKGROUND OF THE INVENTION

Filter housing retention clips made of elastic materials such as spring steel are known and widely used in securing covers to air filter housings and other such housings in motor vehicle applications. Such retention clips are typically pivotally secured onto an air cleaner housing in some fashion and are configured to engage and clamp an air cleaner housing cover to the air cleaner housing body.

Air cleaner housings are typically configured in two separable halves, each which are provided with mating flanges. The air filter element is typically installed into a cavity into the air cleaner housing by separating the housing halves, inserting the filter element, and then securing the housing halves together. One known method of securing air cleaner halves together is with retention clips made of an elastic material as discussed above. Other methods include screws or various known latching devices.

U.S. Pat. No. 4,213,643 discloses a retention clamping lock of the knee lever type, usable to clamp a filter cover onto a filter housing.

U.S. Pat. No. 6,306,192 discloses a filter housing separable into two housing portions and provided with locking clamps having tension levers operable to retentively clamp the two housing portions together. A filter is installed into a cavity therein.

U.S. Pat. No. 7,311,748 discloses an air filter assembly including abutting cylindrical housing halves. The housing halves are joined by T-shaped appendages and a locking mechanism. A filter is installed into a cavity therein.

Filter elements installed into such filter housings are typically provided with a resilient seal member to seal between the filter element and the filter housing. The seal prevents unfiltered air from bypassing the filter element and entering the clean side of the filter housing. Resilient seals are known to resist detaching from the filter housing after they have been installed in the filter housing for a period of time. Elevated operating temperatures can aggravate this condition. If the filter element seal sticks to the housing, the seal can be damaged. Filter seals can also be damaged when improper filter removal techniques are employed, such as prying with a screw driver (for example). Often a filter element needs to be removed for inspection, and then replaced back into the filter housing. Filter seal damage during removal and inspection remains a problem in the art.

SUMMARY OF THE INVENTION

The present invention provides filter assembly including a filter housing having two abutting filter housing portions, a filter element sized and configured to be installed into the filter housing and at least one quick release retention clip pivotally secured to one of the filter housing portions and operable between an engaged and a disengaged position. In the engaged position the retention clip retentively closes the filter housing portions together. In the disengaged position the retention clip applies a separating force to the filter element to urge the filter housing portions to separate and release the filter element.

In some embodiments the abutting filter housing portions, when closed into an aligned and mated relationship, define a cavity therein. The filter housing further includes two complimentary mating flanges with each housing portion having one of the mating flanges formed thereon. The mating flanges are sized and configured so as to sealably close the gap between the two filter housing portions when the flanges are in the aligned and mated relationship (specifically, when the filter housing is closed). The air filter assembly includes a filter element sized and configured to be installed into the filter housing through at least one of the mating flanges. The filter element is configured so as to sealably split the cavity formed by the housing portions into a clean cavity and a dirty cavity when the filter is installed into the filter housing with the housing portions in the aligned and mated relationship. The filter element includes at least one filtration media layer and at least one resilient seal flange disposed around periphery edge portions of the at least one filtration media layer. The seal flange is sized and configured to sealably mate with and close between portions of the seal flanges when the filter element is installed into the filter housing.

Advantageously, at least one quick release retention clip pivotally secured to the exterior of the filter housing is provided. The quick release retention clips are operable between an engaged and a disengaged position. In the engaged position the quick release retention clip retentively secures the filter housing portions together in a closed, aligned and mated relationship. When the retention clip is in the disengaged position, the filter housing portions are permitted to separate (not retentively secured). The retention clip is further operable in the disengaged position to apply a separating force to a portion of the filter element so as to release at least a portion of the filter element seal flange from at least one of the complimentary mating flanges of the housing portions.

In one aspect of the invention, the quick release retention clip is elastically deformed when in the engaged position. The elastic deformation acts to apply a compressive force to maintain the filter housing portions closed in the aligned and mated relationship.

In another aspect of the invention, the quick release retention clip includes an elastic extruded material.

In another aspect of the invention, the quick release retention clip further includes a pry lever portion at a first end of the retention clip. The pry lever portion is adapted and configured to apply a separating force when the retention clip is in the disengaged position. A closure member portion is provided at an opposing second end of the retention clip. The closure member portion is in a hook formation configured to retentively engage an exterior surface of the mating flange of the mating filter housing portions when in the engaged position. The retention clip also includes a pivot pin configured to pivotally mount the retention clip to a side portion of a first one of the filter housing portions. The pivot pin is mounted to the retention clip at a position between the pry lever portion and the closure member portion. The retention clip is rotatable about a pivot axis defined by the pivot pin so as to permit moving of the retention clip between the engaged and disengaged positions.

In another aspect of the invention, the retention clip is operable through the filter element to apply a separating force to separate the second one of the housing portions from the first one of the housing portions when the retention clip is in the disengaged position.

In another aspect of the invention, the quick release retention clip includes an operator member portion secured to and angled outwards and upwards from the quick release retention clip at a position between the pry lever portion and the closure member portion. The operator member portion is sized and adapted to permit operation of the retention clip into any of the engaged and disengaged positions.

In another aspect of the invention the filter housing includes at least one pair of ribs positioned in a spaced parallel relationship and secured to the side portion of the first one of the filter housing portions. The ribs are spaced apart to receive a portion of the retention clip therebetween. Each of the ribs has a hole therethrough. The holes are sized and aligned to supportively receive opposing ends of the pivot pin so as to permit the pivot pin to pivot relative to the ribs.

In another aspect of the invention, the quick release retention clip and the filter housing are molded from plastic in the same mold at the same time. The retention clip is molded in an assembled position with the first one of the filter housing portions. After molding, the retention clip remains connected to the first one of the filter housing portions by a gate that is broken after removal from the mold to allow the retention clip to pivot.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
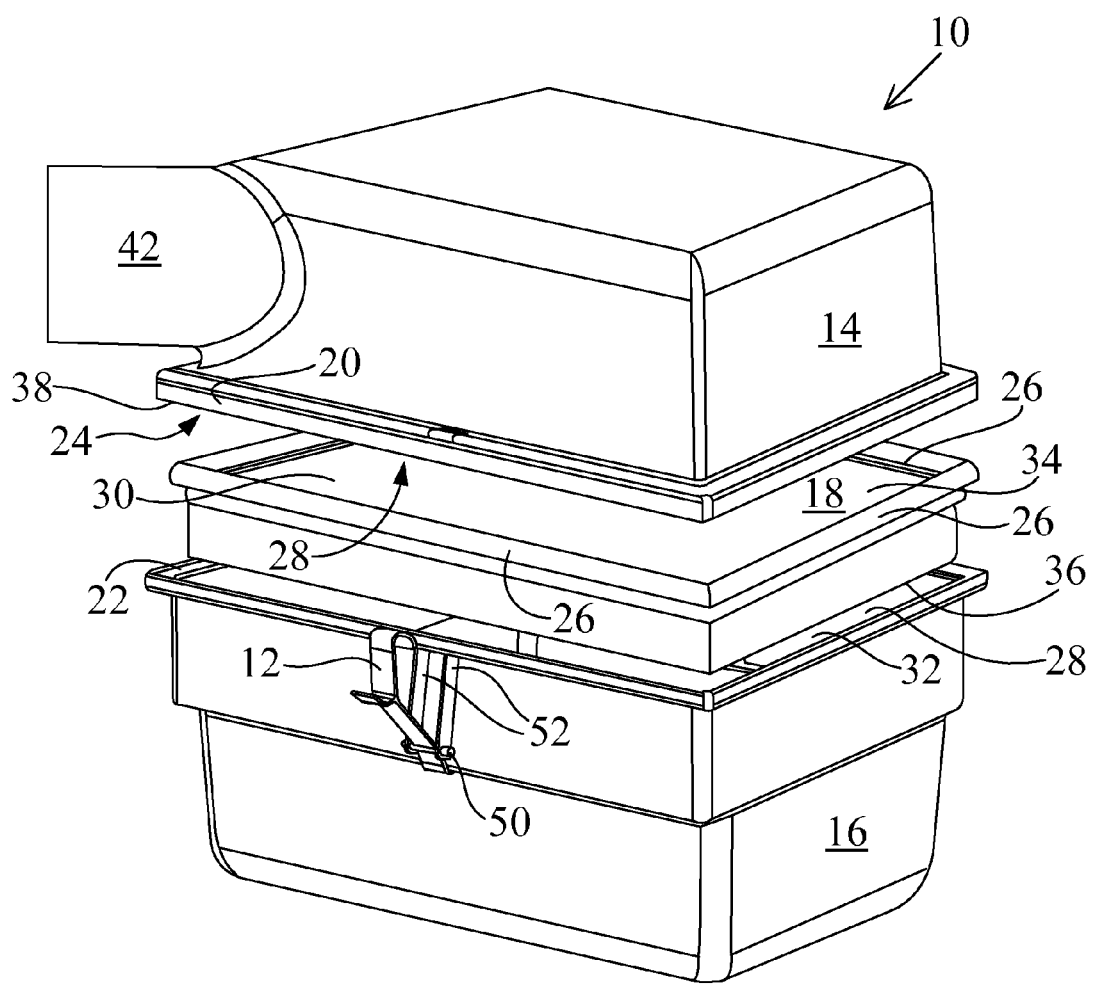
FIG. 1 is a perspective assembly view of a filter housing including a filter element and a quick release retention clip, consistent with one embodiment of the present invention.

FIG. 1 is a perspective assembly view of a filter housing 10 split into two abutting filter housing portions 14 and 16. Each portion 14, 16 of the filter housing 10 is provided with complimentary mating flanges 20, 22 which are configured to mate and sealably close the gap between the top portion 14 and the bottom portion 16 of the filter housing when the filter housing portions 14, 16 are positioned into an aligned and mated relationship.

The top portion 14 of the filter housing and the bottom portion 16 of the filter housing, when aligned and mated along their flanges 20 and 22, define a cavity 28 within the filter housing 10. The filter element 18, when installed into the filter housing 10, sealably splits the cavity 28 into two cavities: a clean cavity 30 positioned above the clean side 34 of the filter element 18, and a dirty cavity 32 positioned below the dirty side 36 of the filter element 18. The dirty side 36 of the filter element 18 is defined as the side of the filter element 18 exposed to the unfiltered air which enters the bottom portion 16 of the filter housing 10 through an air inlet duct (not shown). The clean side 34 of the filter element 18 is defined as the side of the filter element 18 facing the clean cavity 30 in which filtered air from the filter element 18 is gathered and delivered to the clean air duct fitting 42.

Filter element 18 has at least one filtration media layer 24 having pores therethrough configured to permit a fluid stream such as an air stream to pass between the dirty side 36 of the filter 18 to the clean side 34 of the filter while entrapping particulates and contaminants in the filtration media 24.

In the embodiment illustrated in FIG. 1, the filter housing 10 is equipped with a quick release retention clip 12 secured onto an exterior wall of the bottom portion 16 of the filter housing 10 and positioned proximate to the flange 22. For simplicity, FIG. 1 illustrates a single quick release retention clip 12. However, it is preferred that the filter housing 10 include a plurality of quick release retention clips 12 spaced apart about the exterior walls of a filter housing portion (such as filter housing portions 14 and 16) with each retention clip 12 operable to retentively engage with the flange of the abutting filter housing portion (fox example, flange 20 in FIG. 1). It is to be understood that quick release retention clips may be secured onto exterior walls of either portion 14 or 16 of the filter housing, even though FIG. 1 illustrates the quick release retention clip 12 secured to only the bottom portion.

Figure 2A:
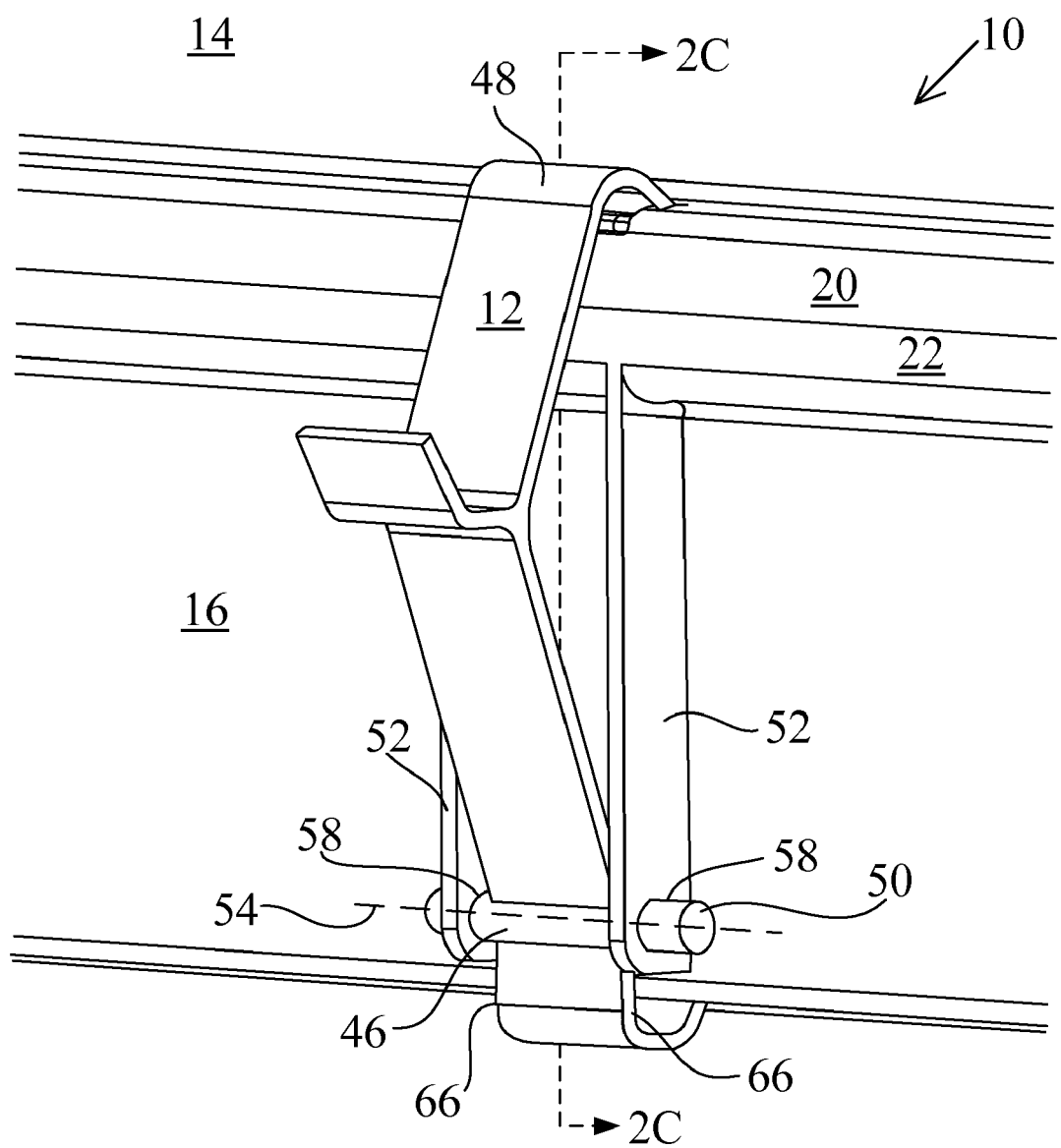
FIG. 2A illustrates a perspective view of a portion of a filter housing having a quick release retention clip pivotally secured to a side of the filter housing in an engaged position.
Figure 2B:
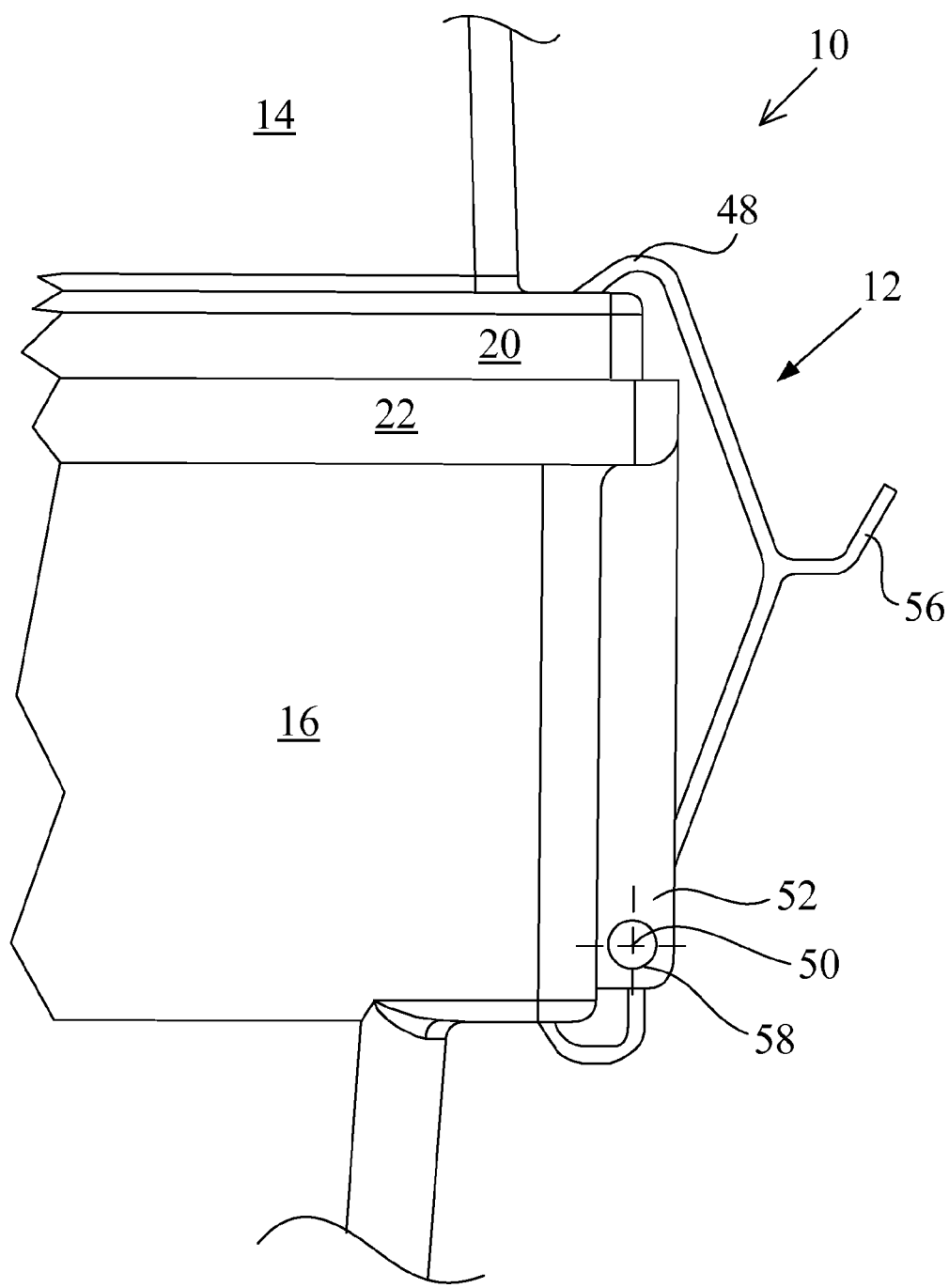
FIG. 2B illustrates a partial side view of the filter housing of FIG. 2A and quick release retention clip pivotally secured thereto, consistent with the present invention.
Figure 2C:
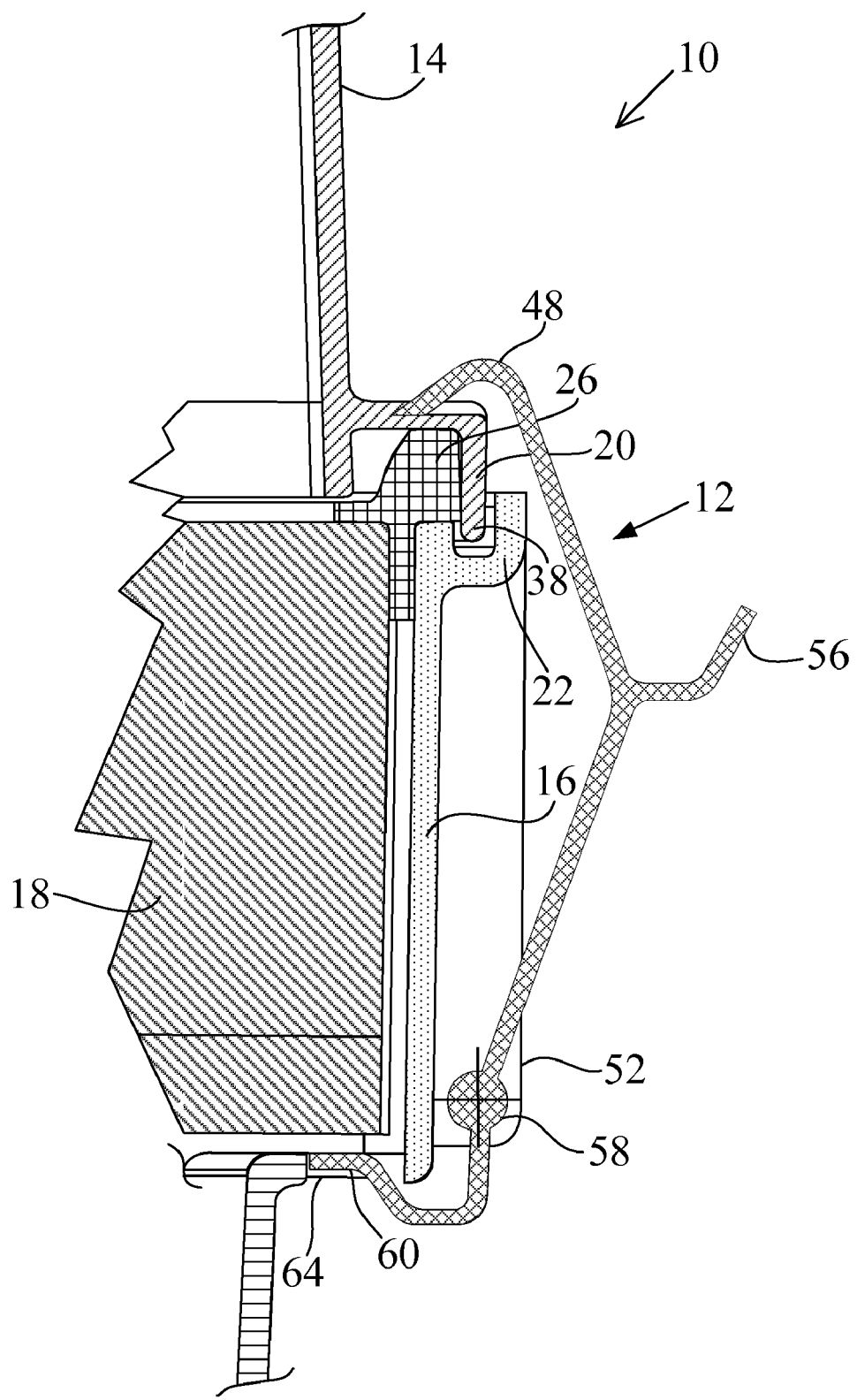
FIG. 2C illustrates a partial sectional view cut along 2C in FIG. 2A illustrating further details of relationships between the quick release retention clip and other elements of the filter housing, consistent with the present invention.

The discussion is now directed to FIGS. 2A, 2B and 2C. FIG. 2A illustrates a perspective view of a portion of filter housing 10 (see FIG. 1) having a quick release retention clip 12 pivotally secured to a side of the filter housing 10. FIG. 2B illustrates a partial side view of a filter housing 10 and quick release retention clip 12 pivotally secured thereto. FIG. 2C illustrates a partial sectional view cut along 2C in FIG. 2A illustrating further details of relationships between the quick release retention clip 12 and other elements of the filter housing 10.

In FIGS. 2A, 2B and 2C the quick release retention clip 12 and filter housing 10 top portion 14 and bottom portion 16 are illustrated in the closed position with the quick release retention clip 12 lockably engaged. Particularly in FIG. 2C, the filter housing 10 has a bottom portion 16 which includes a U-shaped flange 22. Seated against or within the U-shaped flange 22 is the complimentary mating flange 20 of the top portion 14 of the filter housing 10. In the embodiment illustrated in FIG. 2C, the flange 20 of the top portion 14 is a downwardly facing L-shaped flange having a mating edge portion 38 configured to be received into the U-shaped flange 22 of the filter housing bottom portion 16. Flanges 20, 22 are complimentary mating flanges and additionally serve to enforce proper alignment and maintenance of the alignment of the top portion 14 onto the bottom portion 16 of the filter housing 10 when the filter housing portions 14 and 16 are in an aligned and mated relationship.

Installed into the cavity 28 (see FIG. 1) of filter housing 10 is a filter element 18 having at least one filtration media layer 24 (see FIG. 1) and a resilient seal flange 26 continuously disposed around periphery edge portions of the filtration media (see FIG. 1). The resilient seal flange 26 is sized and configured to sealably mate against and close between portions of the top housing portion 14 flange 20 and the U-shaped flange 22 of the bottom portion 16.

In the illustrated embodiment, the quick release retention clip 12 includes a hinge 46 having a pivot pin 50 extending outwards from opposing sides 66 of the retention clip 12 and engaging into holes 58 of distally spaced ribs 52. In some embodiments the pivot pin 50 may be a cylindrical member rotatably attached or alternately fixedly attached to the quick release retention clip 12. In other embodiments the quick release retention clip 12 and the pivot pin 50 are molded in plastic, the pivot pin 50 is molded in one piece with the quick release retention clip 12. In a preferred embodiment the bottom portion 16 of the filter housing 10, the quick release retention clip 12 including the pivot pin 50 and the ribs 52 are injection molded in the same mold at the same time by using a gate (not shown) in the mold between the retention clip 12 and bottom housing portion 16. When the gated mold is used, the molded gate would be broken after removal of the bottom portion 16 from the mold, thereafter permitting the quick release retention clip 12 to pivot freely in the holes 58 of the spaced ribs 52. The material of the quick release retention clip 12 permits it to elastically deform to some degree when in the engaged position (shown in FIGS. 2A, 2B and 2C). The elastic deformation of the retention clip 12 acts to apply a compressive force to maintain closure of the filter housing portions 14, 16 along flanges 20, 22 when the retention clip 12 is in the engaged position (illustrated in FIGS. 2A, 2B, 2C).

Advantageously, the quick release retention clip 12 includes a pry member portion 60 (see FIG. 2C) that is configured to close out an opening 64 (see FIG. 2C) in the bottom portion 16 of the filter housing 10 when the quick release retention clip 12 is in the engaged position.

Quick release retention clip 12 also includes a hook-shaped closure member portion 48 configured to be received over and retentively engage against the flange 20 of the top housing portion 14, thereby compressively and retentively urging the top housing portion 14 and its flange 20 into the U-shaped flange 22 of the housing bottom portion 16, thereby maintaining alignment and closure of the filter housing 10. Quick release retention clip 12 has an operator member portion 56 angled outwards and upwards from filter housing 10. In one embodiment, the quick release retention clip is formed by extrusion of an elastic material such as a plastic or metal having elastic properties. In other embodiments the quick release retention clip 12 is injection molded from a plastic material having elastic properties. In still other embodiments, the quick release retention clip 12 is molded together with one of the filter housing portions in the same mold, as will be discussed later.

Ribs 58 are spaced apart to receive a portion of the quick release retention clip 12 therebetween. Holes 58 and pivot pin 50 define a pivot axis 54 about which the quick release retention clip 12 is rotatable to permit rotating of the quick release retention clip 12 between the engaged position (illustrated in FIGS. 2A, 2B and 2C) and the disengaged position (illustrated in FIGS. 3A and 3B discussed later below).

Figure 3A:
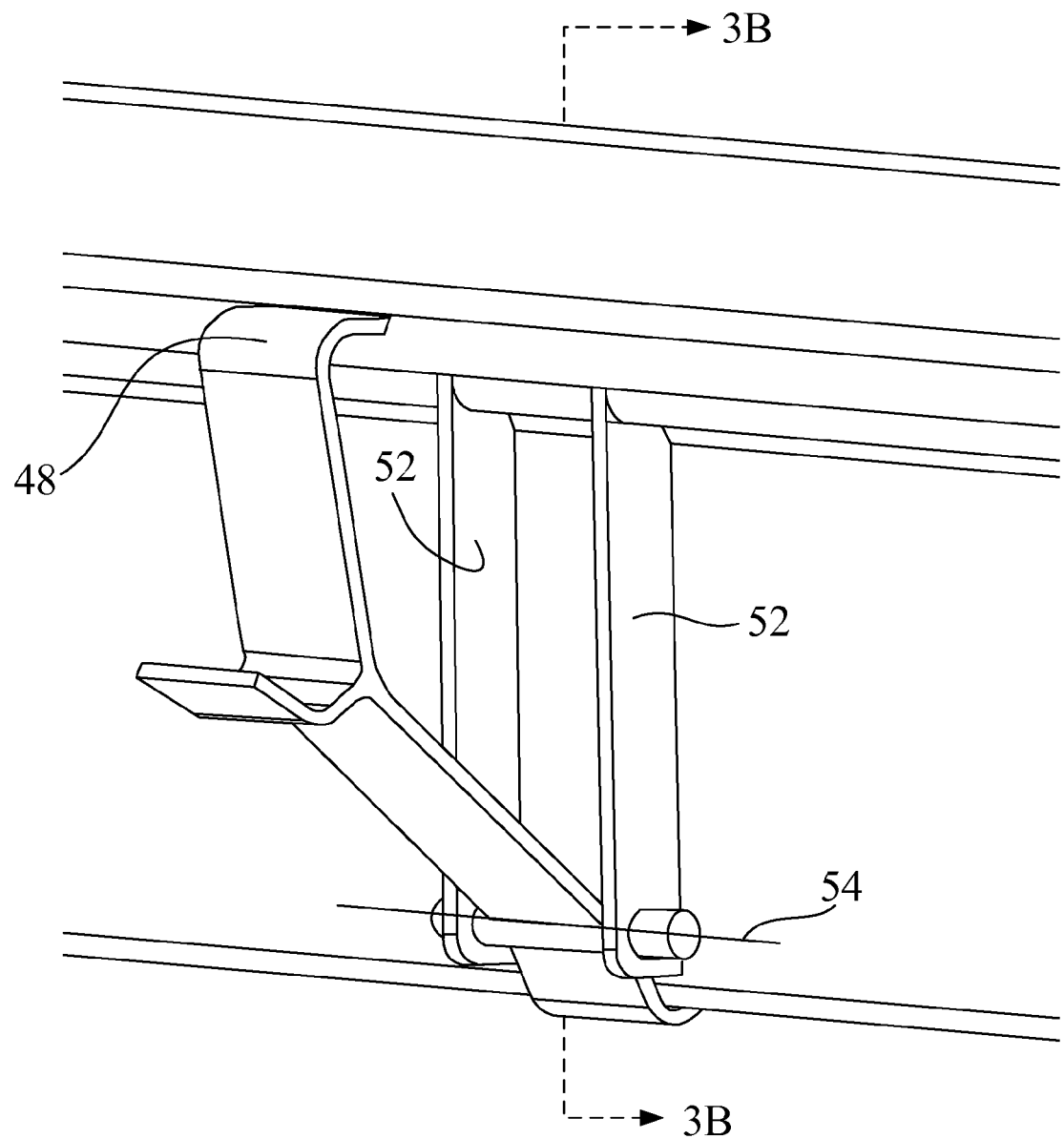
FIG. 3A illustrates a perspective view of a portion of a filter housing having a quick release retention clip pivotally secured to a side of the filter housing in an disengaged position, consistent with the present invention.
Figure 3B:
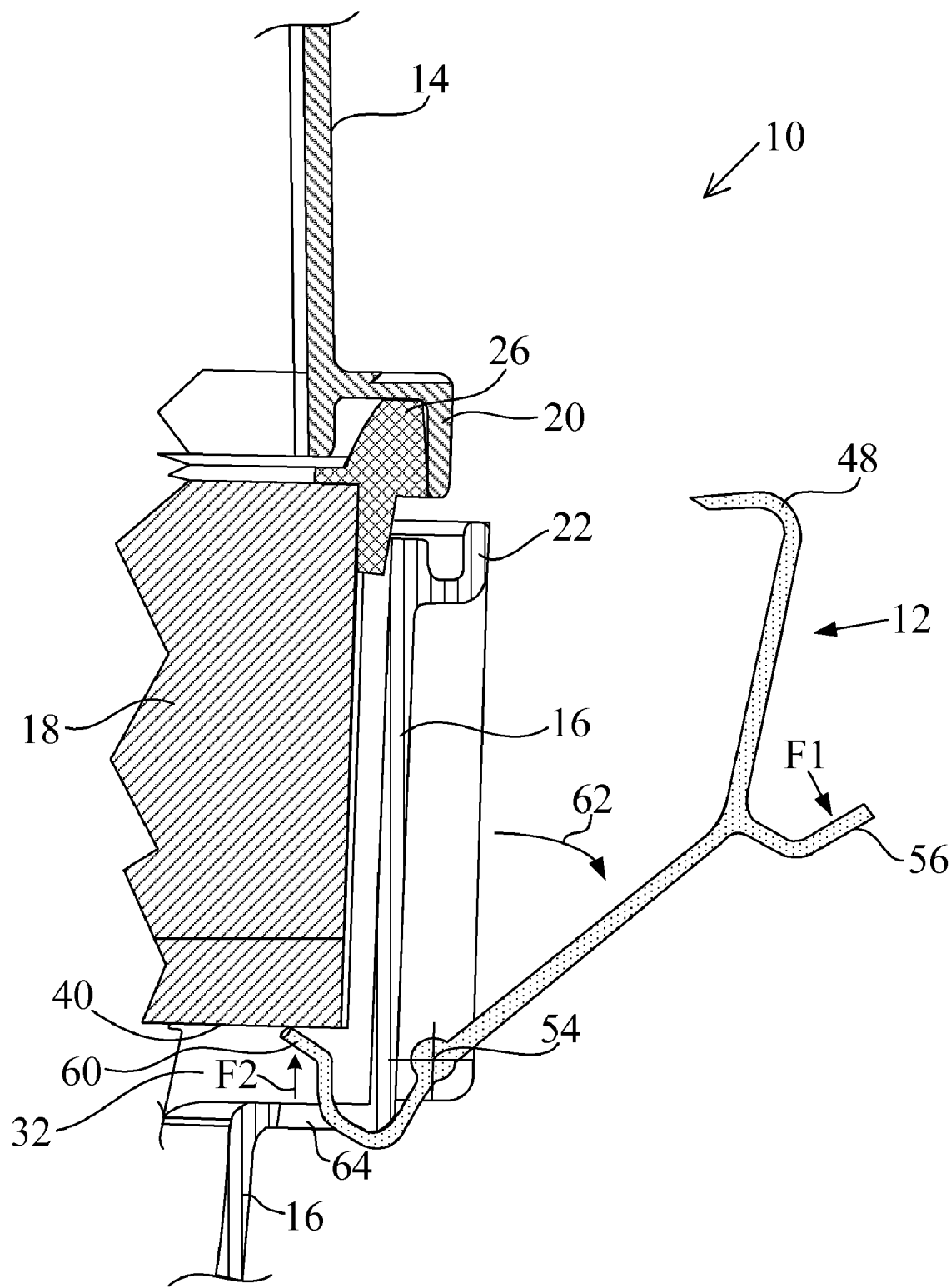
FIG. 3B illustrates a partial sectional view cut along 3B in FIG. 3A illustrating further details of relationships between the quick release retention clip and other elements of the filter housing, consistent with the present invention.

The discussion is now directed to FIGS. 3A and 3B. FIG. 3A illustrates a perspective view of a portion of filter housing 10 having a quick release retention clip 12 pivotally secured, and FIG. 3B illustrates a partial sectional view cut along 3B. FIGS. 3A and 3B now illustrates the quick release retention clip 12 is in a disengaged position with the complimentary flanges 20, 22 no longer mated and with the filter housing 10 in a partially open position.

The quick release retention clip 12 is illustrated as pivoted about the pivot axis 54 such that the hook-shaped closure member portion 48 of the quick release retention clip 12 is withdrawn away (disengaged) from the flange 20 of the top portion 14 of the filter housing 10. Advantageously, as the quick release retention clip 12 is disengaged, the pry member portion 60 is rotated through the opening 64 into the cavity 32 under the filter element 18 and presses upon a lower edge 40 of the filter element 18 to urge the filter element 18 and its resilient seal flange 26 to disengage from the U-shaped flange 22 of the housing bottom portion 16 and raise for removal. Advantageously, the quick release retention clip 12 separates the filter element 18 from the filter housing 10 in a safe and effective manner, reducing the chance of damage to the soft resilient seal flange 26 of the filter element. This feature is particularly advantageous in overcoming a problem in prior art filter housings which lack the quick release retention clip 12 of the present disclosure. In prior art filter housing the resilient seal flange 26 of the filter element 18 may be separated from the filter housing by the use of a pry tool such as a screwdriver or other tool to wedge between the resilient seal flange 26 and the flange 22 of filter housing to pry the filter element from the housing. As can be appreciated, the resilient seal flange 26 is relatively soft and pliable and therefore may be easily damaged by such conventional techniques of removing the filter element 18 from the filter housing 10.

The quick release retention clip 12 is rotatable to the disengaged position (illustrated in FIGS. 3A and 3B) by the application of a force F1 (see FIG. 3B) onto the operator member portion 56 of the quick release retention clip 12, thereby rotating the quick release retention clip 12 about the pivot axis 54 in the direction shown by 62. This rotation moves the pry member 60 portion of the quick release retention clip 12 into engagement against the lower edge 40 of the filter element 18, thereby applying a force F2 (see FIG. 3B) against the lower edge 40 to urge the resilient seal 26 of the filter element 18 to unseat from the U-shaped flange 22 of the bottom portion 16. As the filter element is raised from the bottom portion 16 of the filter housing 10, the pry member 60 acting through the filter element 18 also unseats and raises the top portion 14 of the filter housing 10 from the bottom portion 16, advantageously providing easy removal of the filter housing top portion 14 and access to and removal of the filter element 18.

While the best modes for carrying out the invention have been described in detail, those familiar with the art to which this invention relates will recognize various alternative designs and embodiments for practicing the invention within the scope of the appended claims.

The invention claimed is:

1. A filter assembly comprising:
   a filter housing having two abutting filter housing portions;
   a filter element sized and configured to be installed into said filter housing; and
   at least one quick release retention clip pivotally secured to a first one of said filter housing portions and operable between an engaged and a disengaged position,
   wherein said retention clip in said engaged position retentively closes said filter housing portions; and
   wherein said retention clip in said disengaged position applies a separating force to said filter element to urge said filter housing portions to separate and release said filter element.

2. The filter assembly of claim 1, wherein said quick release retention clip includes:
   a pry lever portion at a first end of said retention clip, said pry lever portion sized and configured to close out an opening in said filter housing when in said engaged position, said pry lever portion operable to engage against said filter element to apply said separating force when in said disengaged position.

3. The filter assembly of claim 2, wherein said quick release retention clip includes:

a closure member portion at an opposing second end of said retention clip, said closure member portion being a hook formation configured to retentively engage an exterior surface of a second one of said filter housing portions when in said engaged position; and a pivot pin configured to pivotally mount said retention clip to a side portion of a first one of said filter housing portions and rotatable about a pivot axis defined by said pivot pin to move said retention clip between said engaged and disengaged positions.

4. The filter assembly of claim 1, wherein said quick release retention clip is elastically deformed when in said engaged position, said elastic deformation applying a compressive force to maintain retentive closure of said filter housing.

5. An air filter assembly comprising in combination:

a filter housing split into two abutting filter housing portions, said filter housing portions, when closed in an aligned and mated relationship, defining a cavity therein, said filter housing including:

two complimentary mating flanges, each housing portion having one of said mating flanges formed thereon, said mating flanges sized and configured to sealably close a gap between said two filter housing portions when said flanges are in said aligned and mated relationship;

a filter element sized and configured to be installed into said filter housing through at least one of said mating flanges, said filter element having a clean side and a dirty side, said filter element configured to sealably split said cavity into a clean cavity and a dirty cavity when said filter is installed into said filter housing with said housing portions in said aligned and mated relationship, said filter element including:

at least one filtration media layer;

at least one resilient seal flange disposed around periphery edge portions of said at least one filtration media layer, said seal flange sized and configured to sealably mate with and close between portions of said seal flanges when said filter element is installed into said filter housing with said housing portions in said aligned and mated relationship; and at least one quick release retention clip pivotally secured to said filter housing and operable between an engaged and a disengaged position, wherein said retention clip in said engaged position retentively secures said filter housing portions together in said aligned and mated relationship, wherein said retention clip in said disengaged position permits said filter housing portions to separate, said retention clip acting to apply a separating force to a portion of said filter element to release at least a portion of said filter element seal flange from at least one of said complimentary mating flanges of said housing portions.

6. The air filter assembly of claim 5, wherein said quick release retention clip is elastically deformed when in said engaged position, said elastic deformation acting to apply a compressive force to maintain said filter housing portions closed in said aligned and mated relationship.

7. The air filter assembly of claim 6, wherein said quick release retention clip comprises an elastic extruded material.

8. The air filter assembly of claim 6, wherein said quick release retention clip includes:

a pry lever portion at a first end of said retention clip, said pry lever portion adapted and configured to apply said separating force when said retention clip is in said disengaged position;

a closure member portion at an opposing second end of said retention clip, said closure member portion being a hook formation configured to retentively engage an exterior surface of said mating flange of said a second one of said filter housing portions when in said engaged position; and a pivot pin configured to pivotally mount said retention clip to a side portion of a first one of said filter housing portions, said pivot pin mounted to said retention clips at a position between said pry lever portion and said closure member portion, said retention clip rotatable about a pivot axis defined by said pivot pin to move said retention clip between said engaged and disengaged positions.

9. The air filter assembly of claim 8, wherein said retention clip is operable through said filter element to apply said separating force to separate said second one of said housing portions from said first one of said housing portions when said retention clip is in said disengaged position.

10. The air filter assembly of claim 9, wherein said quick release retention clip further comprises an operator member portion secured to and angled outwards and upwards from said quick release retention clip at a position between said pry lever portion and said closure member portion, said operator member portion sized and adapted to permit manual operation of said retention clip into any of said engaged and disengaged positions.

11. The air filter assembly of claim 10, further comprising at least one pair of ribs positioned in a spaced parallel relationship and secured to said side portion of said first one of said filter housing portions, said ribs spaced apart to receive a portion of said retention clip therebetween, each of said ribs having a hole therethrough, said holes sized and aligned to supportively receive opposing ends of said pivot pin so as to permit said pivot pin to pivot relative to said ribs.

12. The air filter assembly of claim 11, wherein said quick release retention clip and said filter housing are molded from plastic in the same mold at the same time, said retention clip molded in an assembled position with said first one of said filter housing portions, said retention clip connected to said first one of said filter housing portions by a gate that is broken after removal from said mold to allow said retention clip to pivot.

* * * * *